March 29, 1927.
W. E. ROSS
PHOTOGRAPHIC CAMERA
Filed March 12, 1925
1,622,925
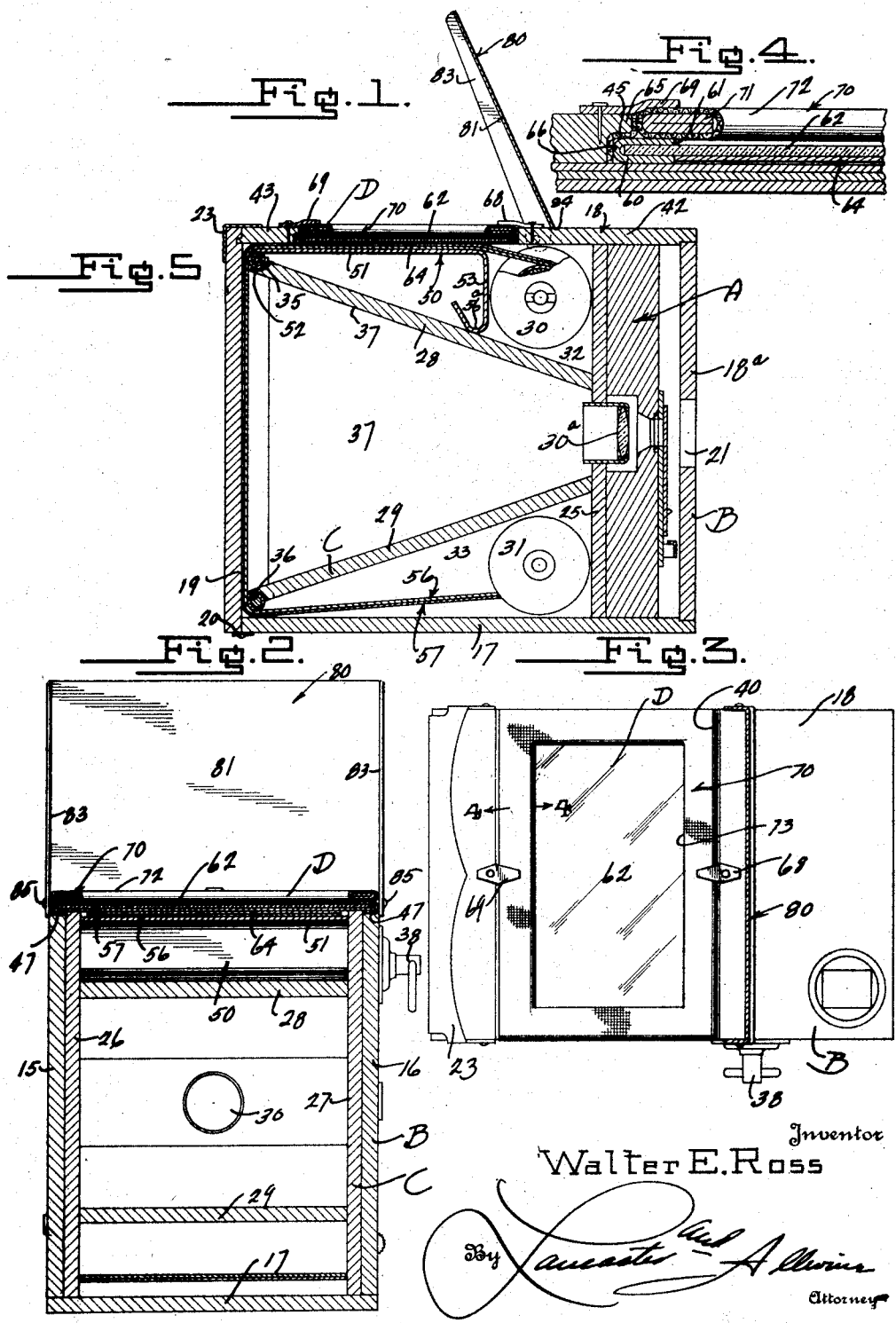
Inventor
Walter E. Ross Patented Mar. 29, 1927.

1,622,925

UNITED STATES PATENT OFFICE.

WALTER ELMER ROSS, OF HIBBS, PENNSYLVANIA.

PHOTOGRAPHIC CAMERA.

Application filed March 12, 1925. Serial No. 15,005.

This invention relates to an improved camera construction, preferably embodying a novel arrangement whereby to permit writing of memoranda, and other indicia upon a film or memorandum strip which is fed with the film, while the same is in the camera and immediately after the exposure has been taken.

An important object of this invention is the provision of a novel type of photographic camera, embodying apparatus which will permit of the writing of memoranda upon the conventional backing and film protecting paper which is found upon roll and pack films, and embodying a novel arrangement for excluding light from the sensitized surface of the film.

A further object of this invention is the provision of a photographic camera embodying means to inscribe appropriate designations upon the backing strip of protecting paper found in connection with photographic films, the improved device being particularly well adapted for use in connection with a box type of camera, the same being simple in construction, and relatively cheap to manufacture.

Other objects and advantages of this invention will be apparent during the course of the following detailed description.

In the accompanying drawing, forming a part of this specification, and wherein similar reference characters designate corresponding parts throughout the several views.

Figure 1 is a longitudinal cross sectional view taken through the box type of camera, for which the improved film recording apparatus is particularly well adapted to be used, showing the same in position for use.

Figure 2 is a transverse cross sectional view taken through the camera and improved details thereof, substantially at right angles to the view illustrated in Figure 1.

Figure 3 is a plan view of the improved camera, showing the novel details thereof in position ready for record entry by an operator.

Figure 4 is an enlarged fragmentary sectional view taken through novel details of the camera, substantially on the line 4—4 of Figure 3.

Figure 5 is a plan view showing a finished picture with the record slip attached thereto, after the picture has been developed.

In the drawing, wherein for the purpose of illustration is shown only a preferred embodiment of this invention, the letter A may generally designate the camera, which may include the housing B; detachable lens and film supporting shell C; and the improved apparatus D cooperatively formed with the housing B and shell C to permit the writing of memoranda upon a record entry slip which cooperatively travels with the film as it is fed thru the camera after exposure.

In the type of camera illustrated in the drawing, commonly known as the box type, the housing B comprises rigidly connected side walls 15 and 16; bottom wall 17; top wall 18; front wall 18ª, and hingedly connected rear wall 19 pivoted as at 20 to the bottom wall 17. In the front wall 18 an aperture 21 is commonly provided. A swivel catch member 23 is pivotally carried by the top wall 18 at the rear end thereof for cooperation over the free swinging end of the rear hinged wall 19, in accordance with conventional construction, to maintain the rear wall 19 closed.

The shell C is detachable thru the opening when the rear wall 19 is open, and this shell C is of the economically produced rigid type, consisting of a front wall 25; spaced side walls 26 and 27; and converging top and bottom walls 28 and 29 respectively, which converge from the rear edges of the side walls in uniformly inclined relation towards the lens structure 30ª which is supported centrally of the front wall 25 of the shell structure C.

Means is provided upon the side walls 26 and 27, above and below the inclined top and bottom walls 28 and 29, and immediately adjacent the front wall 25 for rotatably supporting take-up or winding and supply spools 30 and 31 respectively; the take-up spool 30, of course, being rotatably supported in the compartment 32 just above the shell wall 28 and below the top wall 18 of the housing B; and the supply spool 31 is rotatably supported in the compartment 33 rearwardly of the shell front wall 25 and between the walls 17 and 29, substantially as is illustrated in Figure 1 of the drawing, and as is conventional construction. At the rear top and bottom corners of the shell C, roller shafts 35 and 36 are respectively rotatably supported, over which the film is trained as it passes from the supply roller across the open end of the exposure chamber 37 to the take-up spool 30.

Any approved construction for winding the take-up spool 30 may be provided, such as the adjustable finger holding and winding structure 38, illustrated in Figure 2 of the drawing, which may permit the detachment of the take-up spool.

Referring to improved details of this invention which render the type of camera described particularly well adapted for the recording of data for the respective pictures, as they are taken, upon the film; the top wall 18 of the housing B is provided with an opening 40, from side wall 15 to side wall 16, and this opening inlets into the compartment 32 between the top wall 18 of the housing B and the top wall 28 of the shell C. The top wall 18 is thus divided into a front portion 42, and a rear portion 43, and the edges of these portions 42 and 43 facing the openings 40 are faced with felt or any other resilient material 45, substantially as is illustrated in Figure 4 of the drawing. In analogous manner the top edges of the side walls 15 and 16, outletting at the openings 40 are provided with felt facing material 47, as is illustrated in Figure 2 of the drawings.

A platen 50 is provided as a part of the structure D, including a plate portion 51 which at one end thereof is provided with a curled flange 52 adapted to be slipped about the upper roller 35 at the rear end of the camera; said plate portion 51 at the front end thereof being provided with a right angled supporting flange 53, which at the lower edge thereof is arcuated downwardly and upwardly, at 56ª, for resting on the sloping wall 28. This platen 50 is located on the shell C, in such manner that when the shell C is slipped into the compartment of the casing B, said body portion 51 of the plate will be immediately disposed below the opening 40 of the housing or casing B, providing a table surface as a writing support. The platen 50 is thus connected with the shell C, and is movable therewith.

In position within the camera A the film 56, and the flexible backing paper 57 which accompanies all films for protecting the sensitized surface thereof is wound from the supply spool 31 rearwardly about the roller 36 and upwardly across the exposure chamber 37 and about the curled flange 52 of the platen 50. From here the film and the backing strip 57 are slidably supported upon the plate or body portion 51 of the platen 50, and engage about the take-up spool 30 in the approved manner. It is thus to be noted that the back surface of the backing strip 57 is uppermost, and both the backing strip and the film are positioned between the opening 40 on the body 51 of the platen 50, so that an operator may record data upon the rear surface of the backing strip 57, as will be subsequently mentioned.

In the opening 40, an open polygonal shaped frame 60 is provided, of copper or analogous material, which in cross section is U-shaped, providing a pocket facing the opening 61 of said frame, adapted to receive the marginal edges of a translucent piece of celluloid or mica 62, which is supported across the opening in said frame. The frame 60 may also support therein a piece of carbon paper or ribbon 64, although this carbon paper or ribbon 64, as is illustrated in Figure 4, may be glued or otherwise affixed to the lower surface of the translucent writing surface 62. The element 62 is relatively thick, and cannot break easily, and is so translucent that the light cannot pass therefrom for the purpose of injuring the sensitized surface of the film. To effect the exclusion of all light, the felt facings 45 and 47 cooperate with the frame. At the edge of the portion 43 of the top wall of the camera which faces the opening 40, an overhanging flange portion 65 provides a recess 66 which faces the opening 40, and into which the rear edge of the frame 60 is first shoved into compressed engagement against the felt facing 45, and the frame 60 is then pushed downwardly into snug fitting relation in the opening 40, to obviate the passage of all light into the camera through the opening 40. A clamping and sealing frame 70, of open polygonal shaped formation is provided for resting about the marginal portions of the frame 60; said frame 70 comprising a metal inner body 71 and an outer felt covering 72. The frame 70 provides the opening 73 therethrough for exposing the translucent element 62 upon which a person writes. Locking clips 68 and 69 are respectively swiveled upon the wall portions 42 and 43 for maintaining the frame 70 in a locked position both forwardly and rearwardly, to prevent its detachment, and to more effectively seal the opening 40 against liability of light passing into the camera. It is to be particularly noted that when the frames 60 and 70 are in place, the top surface of the frame 70 will be about flush with the top surface of the wall 18.

A closure 80 is provided for the opening 40, which is preferably of metal, comprising a body 81 with the side flanges 83 therealong in right angled relation therewith. The side flanges 83 are extended rearwardly of the rear edge 84 of the body 81, and are pivotally connected by pins 85 to the side walls 15 and 16. The closure 80 may swing to a closed position over the opening 40, and over the frame 70, with the side flanges 83 lapping over the side walls 15 and 16. When open it is preferred that the closure 80 be limited to an opening movement of approximately 80°, and this is effected by abutment of the edge 84 against the top wall 18, as is illustrated in Figure 1 of the drawing.

From the foregoing description of this invention it is apparent that a novel apparatus for recording of data in connection with exposures as they are taken, has been provided, which may be embodied in any approved type of camera, either of the box or folding type. It is an essential feature of the invention that the recording is done on the film backing strip 57, and to this end the opening 40 is about as wide as an exposure, so that a relatively great writing surface is provided upon which all data pertinent to the picture may be entered. It is the common drawback of recording apparatus now used with cameras, that the space upon which the scribing may be done is relatively restricted. However, with the use of the device herewith described, a writing surface is provided which is of as great area as the picture itself will be when finished.

When the film has been developed and the picture separated, it is merely necessary to attach the record strip to the back of the picture, as is illustrated in Figure 5 of the drawings, where the numeral 90 refers to a picture which has been taken by the camera A, and to the back of which has been attached slip 91, which is really part of the backing strip which followed along with the exposure from which the picture 90 was made. The advantage of providing such a recording strip 91 will be apparent, since thereby a great surface for writing of records and the like is provided. The record slip 91 is of course attached at its upper edge to the rear upper edge of the picture 90.

Various changes in the shape, size, and arrangement of parts may be made to the form of invention herein shown and described, without departing from the spirit of this invention or the scope of the claims.

I claim:

1. In a camera the combination of a casing, adapted to receive a film, a strip of paper within the casing adapted to be cooperatively placed with respect to the film received therein, said casing having an opening therein, and a transfer sheet carried across said opening upon which a person may write for recording a message upon the strip of paper pertinent to an exposure of the film.

2. In a camera the combination of a film receiving casing providing an opening therein, means for moving a film in the camera, a memorandum strip cooperatively disposed with respect to said film, a carbon transfer sheet carried by the casing across said opening and adapted upon being written upon to transfer a message onto the strip pertinent to exposures taken upon the film.

3. In a camera the combination of a film receiving casing providing an opening therein, a supporting platen in the casing below said opening, a backing strip of record entering nature for association with the camera film, means for passing the film through the camera so that the film and backing strip together move through the camera and between said platen support and the opening in said casing with the backing strip uppermost for the entering of records upon said backing strip.

4. In a camera the combination of a casing providing an opening therein, a supporting platen in the casing below said opening, a backing strip of record entering nature for association with the camera film, means for passing the film through the camera so that the film and backing strip together move through the camera and between said platen support and the opening in said casing with the backing strip uppermost for the entering of records upon said backing strip, and a carbon transfer sheet carried in the opening of said casing adapted upon being written upon to transfer characters to the uppermost side of the backing strip associated with said film.

5. In combination a camera casing providing an opening therein, film supply and take-up rollers in the camera casing, a record entering paper strip for association in abutting relation with the film wound on said rollers, means guiding the movement of the film and record entering strip so that the film and record entering strip together pass across said opening in their movement from the supply to the take-up roller, a platen providing a supporting surface below the opening over which the film and record entering strip pass between the same and the opening, a transfer sheet mounted in said opening including a carbon surface facing the recording strip, and a translucent flexible plate carried in said opening over said transfer sheet for the purpose of writing upon to impress the carbon surface of said transfer sheet against said recording strip for entering data thereon.

6. In a camera the combination of a film receiving casing having an opening therein, a recording strip movably associated with said film, means for guiding movement of the film and recording strip across said opening with the recording strip facing said opening, a transfer sheet mounted in the opening including a carbon surface facing the recording strip, and a flexible element providing a writing surface upon which an operator is adapted to write for transferring the carbon to the recording strip.

7. In a camera of the class described the combination of a casing providing an opening therein, flexible facing material in the edges about said opening, a frame for snug fitting in said opening into sealing engagement with said flexible material at the edges about said opening, a translucent flexible sheet of cellulose material carried in said frame across said opening, a carbon transfer sheet affixed below said translucent sheet including a carbon surface facing inwardly of the camera, and means for moving a film and its backing strip with the latter below said carbon surface.

8. In a camera of the class described the combination of a casing providing an opening therein, flexible facing material in the edges about said opening, a frame for snug fitting in said opening into sealing engagement with said flexible material at the edges about said opening, a translucent flexible sheet of cellulose material carried in said frame across said opening, a carbon transfer sheet affixed below said translucent sheet including a carbon surface facing inwardly of the camera, means for moving a film and its backing strip with the latter below said carbon surface, and a closure for said opening.

9. In a camera of the class described the combination of a casing providing an opening therein, flexible facing material in the edges about said opening, a frame for snug fitting in said opening into sealing engagement with said flexible material at the edges about said opening, a translucent flexible sheet of cellulose material carried in said frame across said opening, a carbon transfer sheet affixed below said translucent sheet including a carbon surface facing inwardly of the camera, means for moving a film and its backing strip with the latter below said carbon surface, a frame providing an opening therein, and means for clamping said frame about the marginal portions of the frame first mentioned and into sealing juncture therewith and with the edges about said opening for excluding light from interiorly of said camera.

10. As an article of manufacture a platen for use in cameras comprising a substantially flat shaped body portion having a curled flange at one end thereof and a right angled supporting flange at the opposite end thereof.

WALTER ELMER ROSS.